Figures 1, 2, 3:
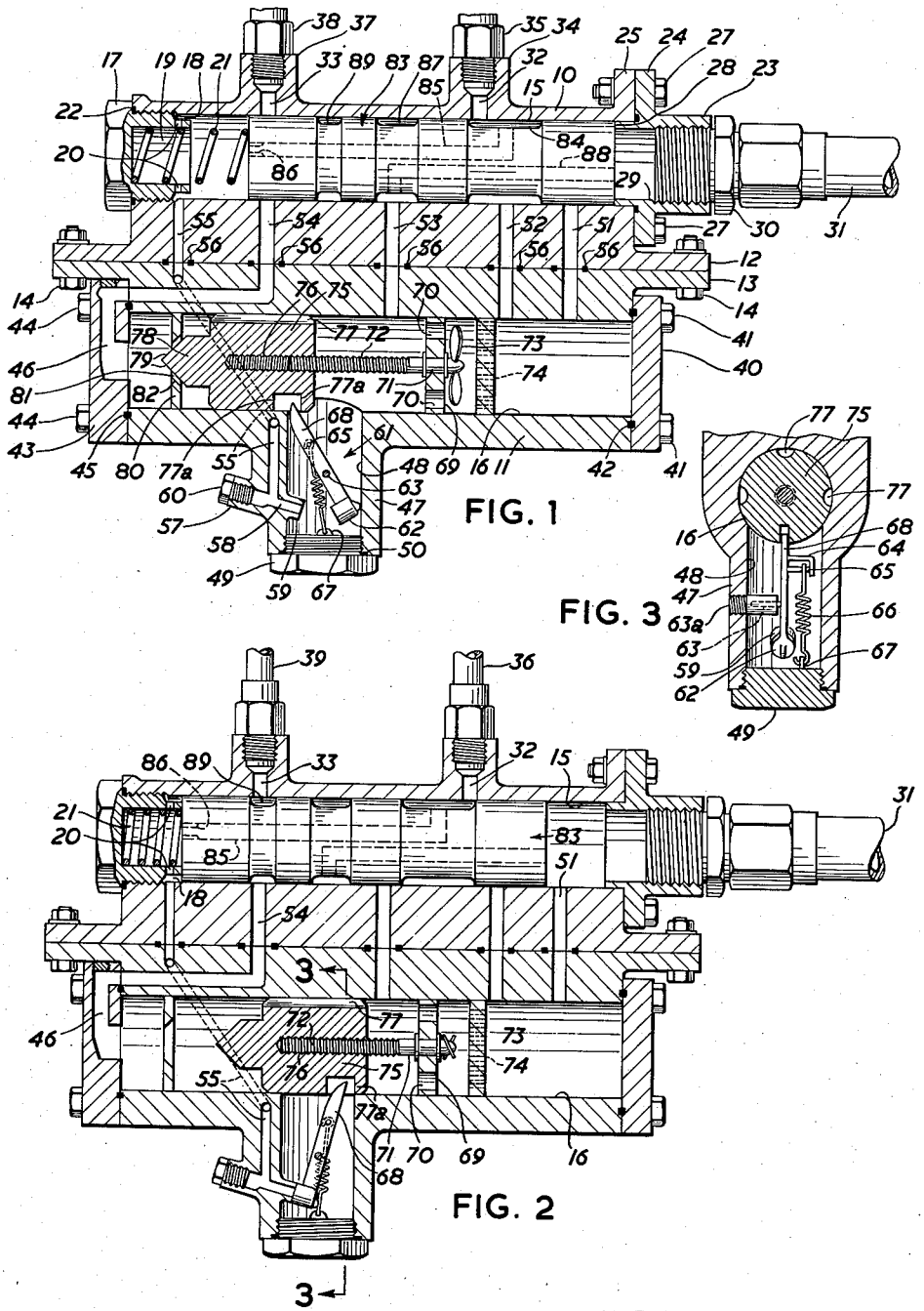

Jan. 17, 1961 K. W. JAY 2,968,317
DEVICE FOR INTERMITTENT FLOW OF FLUID
Filed May 29, 1958 2 Sheets-Sheet 1

INVENTOR
KENNETH WILLIAM JAY
BY: Maybee & Legris
ATTORNEYS

Jan. 17, 1961  K. W. JAY  2,968,317
DEVICE FOR INTERMITTENT FLOW OF FLUID
Filed May 29, 1958  2 Sheets-Sheet 2

INVENTOR
KENNETH WILLIAM JAY
BY: Maybee & Legris
ATTORNEYS

United States Patent Office 2,968,317
Patented Jan. 17, 1961

2,968,317

DEVICE FOR INTERMITTENT FLOW OF FLUID

Kenneth William Jay, Beverley Hills, Ontario, Canada, assignor to Orenda Engines Limited, Malton, Ontario, Canada, a corporation Filed May 29, 1958, Ser. No. 738,720

11 Claims. (Cl. 137—624.14)

This invention relates to a cycling valve, that is to a valve which, as long as it is connected to a source of fluid pressure will continually deliver discrete quantities of fluid. The valve is so arranged that it repeats its operative cycle for as long as it is connected to a source of fluid pressure and during each cycle it delivers a quantity of fluid.

One application of such a valve is to a hot-streak ignition system for an afterburner of a gas turbine engine of an aircraft. A hot-streak ignition system injects an extra quantity of fuel at regulated intervals into one or more of the combustion chambers of the gas turbine engine to cause a flame to pass downstream through the turbine to ignite the afterburner.

Known units for the production of an intermittent flow suitable for hot-streak ignition systems are at least partly electrical and therefore depend upon the electricity supply of the aircraft.

It is an object of the present invention to produce a mechanical, hydraulically-operated cycling valve of simple and reliable construction.

Figure 4:
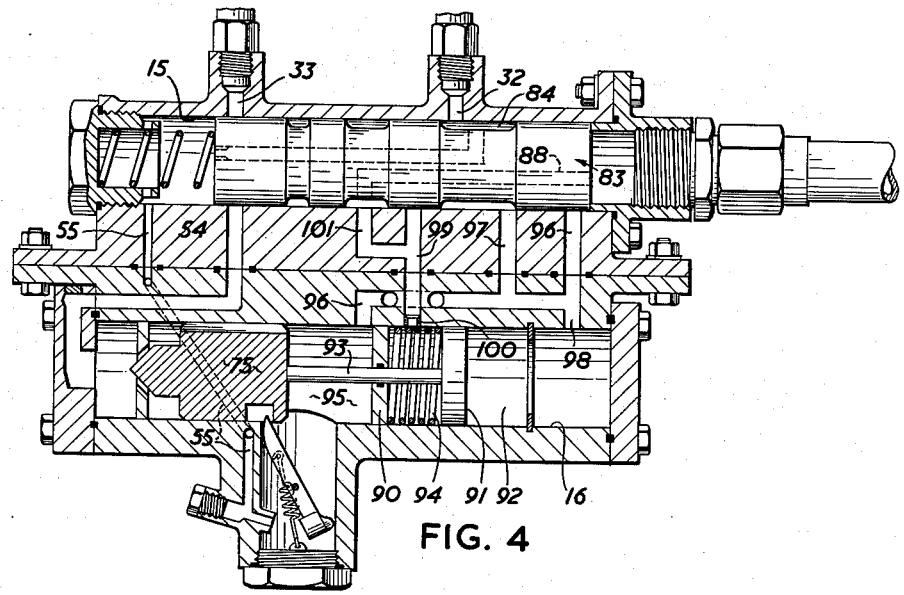
Figure 5:
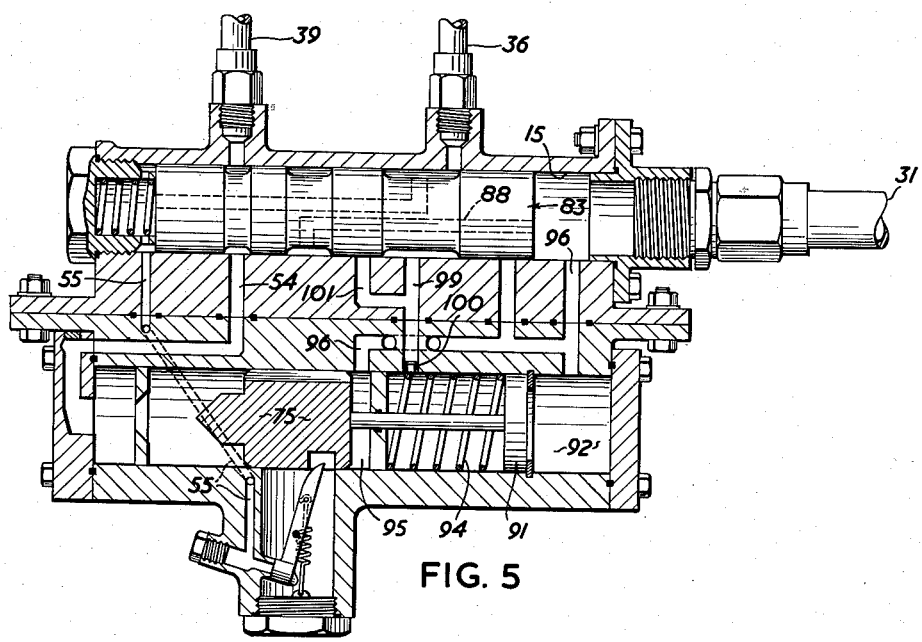

The invention will be described with reference to the accompanying drawings in which like reference numerals indicate similar parts throughout the several views, and in which:

Figure 1 is a longitudinal cross-section of a valve according to the invention with the valve member in a first position, Figure 2 is a cross-section similar to Figure 1 showing the valve member in a second position, Figure 3 is a transverse section on the line III—III of Figure 2, showing the arrangement of the bleed valve, Figure 4 is a cross-section similar to Figure 1 of a second embodiment of the invention, the valve member being in a first position, and Figure 5 is a cross-section of the valve shown in Figure 4 with the valve member in a second position.

Referring now to Figures 1, 2 and 3, the valve comprises a housing formed in two parts, 10 and 11, the parts being formed with mating flanges 12 and 13 respectively and being connected by bolt and nut assemblies 14. The part 10 is formed with a first bore 15 and the part 11 is formed with a second bore 16. One end of the bore 15 is closed by a screw threaded cap 17 threadably engaged in the end of the bore. The cap is relieved to provide an annular passage 18 between the cap and the bore and the cap is also counterbored at 19, the counterbore 19 communicating with the annular passage 18 by ports 20. A spring 21 is received within the counterbore 19. A sealing washer 22 is received within a groove in the end of the housing and seals the joint between the right hand end of the part 10 of the housing and the cap 17.

The other end of the bore 15 is sealed by a cap 23 having a flange 24 to mate with a flange 25 on the part 10. The cap 23 is retained in position by nut and bolt assemblies 27. A sealing ring 28 is received in a groove in the cap and seals the joint between the cap and the housing. The cap projects into the bore 15 to provide an annular stop 28. The cap is internally drilled at 29 and a union 30 is threadably engaged in the interior of the cap and connects it to a fluid inlet pipe 31. The drilling 29 thus provides a fluid inlet to the first bore 15.

The bore 15 is also provided with a first fluid outlet 32 and a second fluid outlet 33. The first outlet 32 is formed within a boss 34 which receives a union 35 connected to an outlet pipe 36 so that the outlet pipe 36 communicates with the outlet 32. Similarly the second outlet 33 is formed in a boss 37 which receives a union 38 which, in turn, connects a pipe 39 to the second outlet 33.

One end of the second bore 16 is closed by a cap 40 held in position by bolts 41; a sealing ring 42 being interposed between the part 11 of the housing and the cap 40 to form a fluid-tight seal. The other end of the second bore 16 is closed by a cap 43 held in position by bolts 44, a sealing ring 45 being interposed between the cap and the part 11 of the housing to form a fluid-tight joint. The cap 43 is provided with a passage 46 which forms part of the second outlet conduit as will hereinafter be described.

A boss 47 depends from the part 11 of the housing and provides a well 48. The bottom of the well is sealed by a screw plug 49 and a sealing ring 50 is interposed between the bottom of the well and the plug 49 to form a fluid-tight joint. The parts 10 and 11 of the housing are bored to form a plurality of conduits which mate up when the parts are bolted together by the bolt and nut assemblies 14. These conduits are as follows: a first inlet conduit 51, a first outlet conduit 52, a second inlet conduit 53, a second outlet conduit 54 and a bleed passage 55. Sealing rings 56 are interposed between the mating flanges 13 and 14 at the points of joining of the conduits.

The bleed passage 55 extends from the first bore 15, at a point adjacent to the cap 17, to the well 48. The well 48 is provided with a boss 57 which has a drilling 58 in communication with the bleed passage. An internal boss 59 projects into the well in register with the boss 57 and the drilling 58 passes through the boss 59 into the well. A screw plug 60 seals the outer end of the boss 57. A bleed valve indicated generally at 61 is pivotally mounted in the well and has an enlarged head portion 62 arranged to seal the end of the drilling 58 in the boss 59. Referring now to Figure 3, the bleed valve is provided with a pivot pin 63 which is received in a screw plug 63a mounted in the wall of the boss 47 and towards its upper end is bifurcated at 64, a pin 65 being received between the bifurcations. A tension spring 66 extends between the pin 65 and a lug 67 on the plug 49. The arrangement of the bleed valve is such that, as it moves from an open position (Figure 1) to a closed position (Figure 2), the pin 65 moves from one side of the pivot pin 63 to the other so that the spring 66 tends to hold the bleed valve in either its open or its closed position. The bleed valve is provided with an arm 68 which extends into the second bore.

Mounted intermediate the ends of the second bore 16 is a spider member 69 provided with apertures 70 permitting fluid to flow from one side of the spider member to the other. Journalled in the spider member is a shaft 71 which is screw-threaded at 72 and also carries a turbine wheel 73. Guide vanes 74 are provided in the second bore to direct fluid flow on to the turbine wheel 73. Slidable in the second bore 16 is an operative member 75 which is internally screw-threaded at 76 to receive the screw thread 72 on the shaft 71. The operative member 75 is provided with peripheral, axial grooves 77 running from one end to the other of the member and with abutments 77a to contact the arm 68 of the bleed valve as the member is moved. A substantially conical projection 78 on the member 75 provides a valve seating 79. A diaphragm 80 extends across the second bore 16 and has an aperture 81 therein, the edge of the aperture being bevelled to provide a valve seating surface 82, the seating surface 82 being complementary to the seating 79.

It will be seen that the first inlet conduit 51 extends from the first bore 15 to the second bore 16 with which the conduit communicates at a position between the turbine wheel 73, which constitutes a control member for the operative member 75, and one end of the second bore 16. The first outlet conduit 52 extends between the first and second bores and also opens into the second bore 16 at a point between the control member, constituted by the turbine wheel 73, and the one end of the second bore 16. The second inlet conduit 53 extends between the second bore and the first bore and communicates with the second bore at a point between the control member, i.e. turbine wheel 73, and the other end of the bore 16, while the second outlet conduit 54 extends between the first and the second bores.

Mounted in the first bore is a spool-type valve member indicated generally at 83. The valve member is movable in the first bore between a first position, shown in Figure 1, and a second position, shown in Figure 2. The valve member is provided with a first annular recess 84 which is in communication with the first outlet 32 in the first position of the valve member. A first passage 85 is formed through the valve member from the end thereof adjacent to the cap 17 to the first annular recess 84 and a restriction 86 is formed in the end of the passage 85. The valve member is also formed with a second annular recess 87 and a second passage 88 which extends from the end of the valve member adjacent to the inlet to the second annular recess 87. Finally the valve member is provided with a third annular recess 89.

The operation of the embodiment described is as follows: referring to Figure 2 and assuming that the valve member is in the second position as shown and that fluid is supplied to the fluid inlet pipe 31, fluid will flow through the first inlet conduit 51 into the second bore 16, through the guide vanes 74, the apertures 70 in the spider member 69, the axial grooves 77 of the operative member 75, the passage 46, the second outlet conduit 54, around the third annular recess 89 and out through the second outlet 33 into the outlet pipe 39. As fluid flows through the guide vanes 74, it rotates the turbine 73 therefore rotates the shaft 71. The coaction of the screw thread 72 on the shaft 71 and the screw-thread 76 in the operative member 75 moves the operative member towards the left in the figures so that one of the abutments 77a co-acts with the arm 68 of the bleed valve to open the bleed valve. Upon opening of the bleed valve, fluid then passes from the second bore through the bleed valve, along the bleed passage 55, into the annular recess 18 and through the ports 20 to the left-hand end of the valve member 83. Some of the fluid escapes through the first passage 85 to the outlet 32. However, the combined effects of the fluid pressure generated by the restriction 86 and the pressure of the spring 21 moves the valve to the right to the first position as shown in Figure 1.

In the first position, the valve seals off the first inlet conduit 51 but the second inlet conduit 53 is placed in communication with the inlet of the first bore through the second passage 88 in the valve member. Fluid therefore flows from the inlet through the passage 88, and the second inlet conduit 53 into the second bore. The fluid is prevented from escaping through the second outlet conduit 54 due to the fact that this is sealed by the valve member at the first bore; the fluid therefore passes to the right in Figure 1, past the turbine wheel 73, through the first outlet conduit 52 into the first annular recess 84 and out through the first outlet 32 into the pipe 36. The flow of fluid from left to right past the turbine wheel 73 rotates the wheel in the opposite direction from the direction in which it is rotated by the fluid flowing from right to left and therefore moves the operative member to the right in Figure 1 until one of the abutments 77a co-acts with the arm 63 to close the bleed valve. When the bleed valve is closed there is no fluid pressure at the left hand end of the valve member so that the fluid pressure at the right hand end moves the valve member against the spring to the second position as shown in Figure 2 and the cycle is repeated.

The pipe 39 is connected to the desired receiving apparatus; in the case of a hot-streak injection system the pipe 39 will be connected to the combustion chamber of the gas turbine engine so that everytime that the valve goes through a cycle a predetermined amount of fuel, depending on the time taken for the turbine wheel 73 to move the operative member 75 to open the bleed valve, will be dispatched through the pipe 39. The pipe 36 may be connected to the inlet of a pump (not shown) which supplies fluid to the inlet pipe 31 or could be connected to a reservoir from which fluid is drawn to operate the valve.

If, due to failure of the bleed valve, movement of the operative member to the left did not open the bleed valve, fluid would continue to flow through the second bore and rotate the turbine wheel 73. The operative member 75 would continue to move to the left until the conical projection 78 entered the aperture 81 of the diaphragm 80. The valve seating 79 would then come into contact with the valve seating 82 and the aperture would be closed. Fluid would then be prevented from flowing through the second outlet conduit 54 to the outlet pipe 39. Thus, if anything fails in the valve, no further fluid will be delivered and the valve will therefore "fail safe."

Referring now to Figures 4 and 5, there is shown a second embodiment of the invention in which a different means is used for controlling the opening and closing of the bleed valve. The arrangement of the first bore with its valve member and connecting fluid outlets is the same as described with reference to Figures 2 and 3 and therefore the same reference numerals have been used and the arrangement will not be described further. Moreover, the bleed valve, bleed passage, second outlet conduit and the operative member for opening and closing the bleed valve are also the same and are referred to by the same numbers.

Referring now to Figures 4 and 5, the second bore 16 is divided into two portions by a fluid-tight bulkhead 90. A piston 91 is slidable in the first portion 92 of the second bore and a piston rod 93 is connected to the piston 91 at one end, passes through the bulkhead 90, and is connected to the operative member 75 at the other end. A compression spring 94 is interposed between the piston 91 and the bulkhead 90. The operative member 75 is mounted in the second portion 95 of the second bore 16.

In this embodiment, a first inlet conduit indicated at 96 extends from the first bore to open into the first portion 92 of the second bore and also into the second portion 95 of the second bore; a first outlet conduit 97 is provided which is formed partly by the drilling forming the inlet conduit 96. The first inlet conduit 96 and the first outlet conduit 97 open at 98 into the first portion 92 of the second bore between the piston 91 and the end of the first portion remote from the bulkhead 90.

A third outlet conduit 99 extends between the first bore and the first portion of the second bore and opens into the second bore between the bulkhead 90 and the piston 91. A restriction 100 is formed in the third outlet conduit 99. The second inlet conduit is indicated at 101 and shares part of the drilling forming the third outlet conduit 99.

The operation of the embodiment of Figures 4 and 5 is as follows, referring to Figure 5, and assuming that the valve member 83 is in its second position, fluid will flow from the inlet pipe 31 through the first inlet conduit 96 into the second portion 95 of the second bore, and through the second outlet conduit 54 to the outlet pipe 39. Fluid will also flow into the first portion 92 of the second bore and will move the piston 91 towards the left, the fluid between the piston 91 and the bulkhead will move out through the third outlet conduit 99, the speed with which the fluid moves out being controlled by the restriction 100 and the rate of the spring 94. As the piston moves to the left, the operative member 75 will also move to the left until it opens the bleed valve in the manner herein before described.

When the bleed valve is opened, the valve member 83 will move to the right to the first position (see Figure 4) as previously described and fluid will then flow through the first passage 88, the second inlet conduit 101, through the restriction 100 into a space between the bulkhead 90 and the piston 91. The piston will then begin to move to the right under the influence of the spring 94 and fluid pressure, and the fluid trapped in the first portion of the bore 92 between the piston and the end of the portion remote from the bulkhead will move out through the first outlet conduit 97, around the first annular recess 84 to the pipe 36. As the piston moves to the right, the operative member 75 will close the bleed valve whereupon the valve member 83 will move to the left as hereinbefore described and another cycle will commence.

As in the previous embodiment, the pipe 39 will be connected to the desired outlet and the valve will deliver a discrete quantity of fluid through the pipe 39 for every cycle of the valve.

It will be seen that the invention provides a simple inexpensive mechanical cycling valve capable of delivering discrete quantities of fluid continually as long as fluid under pressure is supplied to the valve.

It will be understood that the form of the invention herewith shown and described is a preferred example and various modifications can be carried out without departing from the spirit of the invention or the scope of the appended claims.

What I claim as my invention is:

1. A cycling valve, comprising a housing; first and second bores in the housing; a fluid inlet and first and second fluid outlets in the housing and opening into the first bore; a bleed passage extending between the first and second bores; a valve member having opposed ends in the first bore, the valve member being arranged within the bore to be slidable therein and so that in all positions of the valve member one end thereof is in communication with the inlet and the other end of the valve member is in communication with the bleed passage; first, second and third annular recesses in the valve member; a first passage in the valve member extending from said other end thereof to said first recess; a restriction in the first passage to restrict fluid flow therethrough; a second passage in the valve member extending from said one end to said second recess; a bleed valve associated with the bleed passage and having open and closed positions in which fluid flow through the bleed passage is respectively permitted and prevented; a control member in the second bore associated with the bleed valve and reversibly movable under the influence of fluid entering the second bore to open and close the bleed valve; means to control the speed of movement of the control member; a first inlet conduit extending between the first and second bores and opening into the second bore between one end thereof and the control member; a second inlet conduit extending between the first and second bores and opening into the second bore between the other end thereof and the control member; a first outlet conduit extending between the first and second bores and opening into the second bore between said one end thereof and the control member; a second outlet conduit extending between the first and second bores; and spring means urging the valve member to a first position in which the first recess communicates with the first outlet and the valve member seals the first inlet conduit, opens the second inlet conduit to the second recess, opens the first outlet conduit to the first recess and seals the second outlet conduit; the valve member being slidable along the first bore under the influence of fluid pressure in the inlet when the bleed valve is closed to a second position in which the first recess communicates with the first outlet and the third recess communicates with the second outlet and in which the valve member opens the first inlet conduit to the inlet, seals the second inlet conduit, seals the first outlet conduit and opens the second outlet conduit to the third recess; whereby, when the valve member is in its second position, fluid flows from the inlet through the first inlet conduit, the second bore, the second outlet conduit, and the third recess to the second outlet and causes the control member to move to open the bleed valve, the opening of the bleed valve allowing fluid to flow along the bleed passage from the second bore to the other end of the valve member along the first passage and through the first recess to the first outlet; the spring means and the pressure generated by said restriction returning the valve member to the first position; whereas, when the valve member is in the first position, fluid flows from the inlet along the second passage, through the second recess and the second inlet conduit into the second bore to move the control member to close the bleed valve, fluid in the second bore displaced during said movement of the control member flowing through the first outlet conduit to the first outlet; the closing of the bleed valve causing the valve member to move to the second position under the influence of fluid pressure in the inlet.

2. A cycling valve, comprising a housing provided with first and second bores; a fluid inlet in the housing opening into one end of the first bore; first and second fluid outlets in the housing and opening into the first bore at spaced apart positions intermediate the ends thereof; a bleed passage extending between the other end of the first bore and the second bore; a bleed valve associated with the bleed passage and having open and closed positions in which fluid flow through the bleed passage is respectively permitted and prevented; first and second inlet conduits and first and second outlet conduits each extending between the first and second bores, said conduits extending between spaced apart points on the first bore intermediate the ends thereof and spaced apart points on the second bore; a valve member slidably located in the first bore so that one end of the valve member is exposed to said inlet and the other end of the valve member is exposed to said bleed passage, the valve member being slidable between first and second positions; passage means in the valve member connecting said other end thereof to the first fluid outlet in both positions of the valve member; fluid directing means on the valve member which, in the first position of the valve member block the first inlet conduit and the second outlet conduit, connect the second inlet conduit to the fluid inlet and connect the first outlet conduit to the first outlet, while in the second position of the valve member fluid directing means block the first outlet conduit and the second inlet conduit, connect the first inlet conduit to the fluid inlet and connect the second outlet conduit to the second outlet; spring means acting on said other end of the valve member to bias the valve member towards its first position; means to control the rate of fluid flow through the passage means to cause the valve member to assume its first position under the influence of the spring means when the bleed valve is open; and a reversibly movable control member positioned in the second bore between, on the one hand, points at which the first inlet conduit and first outlet conduit open into the second bore and, on the other hand, points at which the second inlet conduit and the second outlet conduit open into the second bore, the control member being associated with the bleed valve and movable under the influence of fluid entering the second bore from the first inlet conduit to open the bleed valve and movable under the influence of fluid entering the second bore from the second inlet conduit to close the bleed valve; closing of the bleed valve permitting fluid pressure on said other end of the valve member to decay through escape of fluid through said passage means whereby the valve member is moved to its second position by fluid pressure exerted on said one end from the fluid inlet.

3. A cycling valve, comprising a housing provided with first and second bores; a fluid inlet in the housing opening into one end of the first bore; first and second fluid outlets in the housing and opening into the first bore at spaced apart positions intermediate the ends thereof; a bleed passage extending between the other end of the first bore and the second bore; a bleed valve associated with the bleed passage and having open and closed positions in which fluid flow through the bleed passage is respectively permitted and prevented; first and second inlet conduits and first and second outlet conduits each extending between the first and second bores, said conduits extending between spaced apart points on the first bore intermediate the ends thereof and spaced apart points on the second bore; a valve member slidably located in the first bore so that one end of the valve member is exposed to said inlet and the other end of the valve member is exposed to said bleed passage, the valve member being slidable between first and second positions; passage means in the valve member connecting said other end thereof to the first fluid outlet in both positions of the valve member; fluid directing means on the valve member which, in the first position of the valve member block the first inlet conduit and the second outlet conduit, connect the second inlet conduit to the fluid inlet and connect the first outlet conduit to the first outlet, while in the second position of the valve member the fluid directing means block the first outlet conduit and the second inlet conduit, connect the first inlet conduit to the fluid inlet and connect the second outlet conduit to the second outlet; spring means acting on said other end of the valve member to bias the valve member towards its first position; means to control the rate of fluid flow through the passage means to cause the valve member to assume its first position under the influence of the spring means when the bleed valve is open; a reversibly movable control member positioned in the second bore between, on the one hand, points at which the first inlet conduit and the first outlet conduit open into the second bore and, on the other hand, points at which the second inlet conduit and the second outlet conduit open into the second bore, the control member being associated with the bleed valve and movable under the influence of fluid entering the second bore from the first inlet conduit to open the bleed valve and movable under the influence of fluid entering the second bore from the second inlet conduit to close the bleed valve; and means to control the speed of movement of the control member; closing of the bleed valve permitting fluid pressure on said other end of the valve member to decay through escape of fluid through said passage means whereby the valve member is moved to its second position by fluid pressure exerted on said one end from the fluid inlet.

4. A cycling valve, comprising a housing provided with first and second bores; a fluid inlet in the housing opening into one end of the first bore; first and second fluid outlets in the housing and opening into the first bore at spaced apart positions intermediate the ends thereof; a bleed passage extending between the other end of the first bore and the second bore; a bleed valve associated with the bleed passage and having open and closed positions in which fluid flow through the bleed passage is respectively permitted and prevented; first and second inlet conduits and first and second outlet conduits each extending between the first and second bores, said conduits extending between spaced apart points on the first bore intermediate the ends thereof and spaced apart points on the second bore; a valve member slidably located in the first bore so that one end of the valve member is exposed to said inlet and the other end of the valve member is exposed to said bleed passage, the valve member being slidable between first and second positions; first passage means in the valve member connecting said other end thereof to the first fluid outlet in both positions of the valve member; fluid directing means on the valve member including first and second annular recesses and second passage means extending from said one end of the valve member to said second recess, in the first position of the valve member the fluid directing means blocking the first inlet conduit and the second outlet conduit, connecting the second inlet conduit to the fluid inlet via said second passage means and said second recess and connecting the first outlet conduit to the first outlet via said first recess, while in the second position of the valve member, the fluid directing means block the first outlet conduit and the second inlet conduit, connect the first inlet conduit to the fluid inlet and connect the second outlet conduit to the second outlet; spring means acting on said other end of the valve member to bias the valve member towards its first position; means to control the rate of fluid flow through the first passage means to cause the valve member to assume its first position under the influence of the spring means when the bleed valve is open; and a reversibly movable control member positioned in the second bore between, on the one hand, points at which the first inlet conduit and the first outlet conduit open into the second bore and, on the other hand, points at which the second inlet conduit and the second outlet conduit open into the second bore, the control member being associated with the bleed valve and movable under the influence of fluid entering the second bore from the first inlet conduit to open the bleed valve and movable under the influence of fluid entering the second bore from the second inlet conduit to close the bleed valve; closing of the bleed valve permitting fluid pressure on said other end of the valve member to decay through escape of fluid through said first passage means whereby the valve member is moved to its second position by fluid pressure exerted on said one end from the fluid inlet.

5. A cycling valve, comprising a housing provided with first and second bores; a fluid inlet in the housing opening into one end of the first bore; first and second fluid outlets in the housing and opening into the first bore at spaced apart positions intermediate the ends thereof; a bleed passage extending between the other end of the first bore and the second bore; a bleed valve associated with the bleed passage and having open and closed positions in which fluid flow through the bleed passage is respectively permitted and prevented; first and second inlet conduits and first and second outlet conduits each extending between the first and second bores, said conduits extending between spaced apart points on the first bore intermediate the ends thereof and spaced apart points on the second bore; a valve member slidably located in the first bore so that one end of the valve member is exposed to said inlet and the other end of the valve member is exposed to said bleed passage, the valve member being slidable between first and second positions; first passage means in the valve member connecting said other end thereof to the first fluid outlet in both positions of the valve member; fluid directing means on the valve member including first, second and third annular recesses and second passage means extending from said one end of the valve member to said second recess, in the first position of the valve member the fluid directing means blocking the first inlet conduit and the second outlet conduit, connecting the second inlet conduit to the fluid inlet through said second passage means and said second recess and connecting the first outlet conduit to the first outlet via said first annular recess, while in the second position of the valve member the fluid directing means block the first outlet conduit and the second inlet conduit, connect the first inlet conduit to the fluid inlet and connect the second outlet conduit to the second outlet via said third annular recess; spring means acting on said other end of the valve member to bias the valve member towards its first position; means to control the rate of fluid flow through said first passage means to cause the valve member to assume its first position under the influence of the spring means when the bleed valve is open; and a reversibly movable control member positioned in the second bore between, on the one hand, points at which the first inlet conduit and the first outlet conduit open into the second bore and, on the other hand, points at which the second inlet conduit and the second outlet conduit open into the second bore, the control member being associated with the bleed valve and movable under the influence of fluid entering the second bore from the first inlet conduit to open the bleed valve and movable under the influence of fluid entering the second bore from the second inlet conduit to close the bleed valve; closing of the bleed valve permitting fluid pressure on said other end of the valve member to decay through escape of fluid through said first passage means whereby the valve member is moved to its second position by fluid pressure exerted on said one end from the fluid inlet.

6. A cycling valve, comprising a housing provided with first and second bores; a fluid inlet in the housing opening into one end of the first bore; first and second fluid outlets in the housing and opening into the first bore at spaced apart positions intermediate the ends thereof; a bleed passage extending between the other end of the first bore and the second bore; a bleed valve associated with the bleed passage and having open and closed positions in which fluid flow through the bleed passage is respectively permitted and prevented; first and second inlet conduits and first and second outlet conduits each extending between the first and second bores, said conduits extending between spaced apart points on the first bore intermediate the ends thereof and spaced apart points on the second bore; a valve member slidably located in the first bore so that one end of the valve member is exposed to said inlet and the other end of the valve member is exposed to said bleed passage, the valve member being slidable between first and second positions; passage means in the valve member connecting said other end thereof to the first fluid outlet in both positions of the valve member; fluid directing means on the valve member which, in the first position of the valve member, block the first inlet conduit and the second outlet conduit, connect the second inlet conduit to the fluid inlet and connect the first outlet conduit to the first outlet, while in the second position of the valve member the fluid directing means block the first outlet conduit and the second inlet conduit, connect the first inlet conduit to the fluid inlet and connect the second outlet conduit to the second outlet; spring means acting on said other end of the valve member to bias the valve member towards its first position; means to control the rate of fluid flow through the passage means to cause the valve member to assume its first position under the influence of the spring means when the bleed valve is open; a reversibly movable control member positioned in the second bore between, on the one hand, points at which the first inlet conduit and the first outlet conduit open into the second bore end, on the other hand, points at which the second inlet conduit and the second outlet conduit open into the second bore, the control member being associated with the bleed valve and movable under the influence of fluid entering the second bore from the first inlet conduit to open the bleed valve and movable under the influence of fluid entering the second bore from the second inlet conduit to close the bleed valve; closing of the bleed valve permitting fluid pressure on said other end of the valve member to decay through escape of fluid through said passage means whereby the valve member is moved to its second position by fluid pressure exerted on said one end from the fluid inlet; an operative member slidable in the second bore and connected to, and movable by, the control member, grooves in the operative member to permit fluid flow past said member; a first valve seat in the second bore associated with the second outlet conduit; and a second valve seat on the operative member, movement of the control member in excess of a predetermined extent moving the operative member to bring the valve seats into sealing engagement to prevent fluid flow through the second outlet conduit.

7. A cycling valve according to claim 6, wherein said control member comprises a turbine in the second bore reversibly rotatable under the influence of fluid entering the second bore and wherein complementary screw means are provided on the turbine and the operative member whereby rotation of the turbine moves the operative member to open and close the bleed valve.

8. A cycling valve, comprising a housing provided with first and second bores; a well opening into the second bore; a fluid inlet in the housing opening into one end of the first bore; first and second fluid outlets in the housing and opening into the first bore at spaced apart positions intermediate the ends thereof; a bleed passage extending between the other end of the first bore and the well, a bleed valve mounted in said well at one end of the bleed passage and having open and closed positions in which fluid flow through the bleed passage is respectively permitted and prevented; spring means associated with the bleed valve to hold the valve in one of its open and closed positions until the valve is moved to the other position; an arm of the bleed valve projecting into the second bore; first and second inlet conduits and first and second outlet conduits each extending between the first and second bores, said conduits extending between spaced apart points on the first bore intermediate the ends thereof and spaced apart points on the second bore; a valve member slidably located in the first bore so that one end of the valve member is exposed to said inlet and the other end of the valve member is exposed to said bleed passage, the valve member being slidable between first and second positions; passage means in the valve member connecting said other end thereof to the first fluid outlet in both positions of the valve member; fluid directing means on the valve member which, in the first position of the valve member, block the first inlet conduit and the second outlet conduit, connect the second inlet conduit to the fluid inlet and connect the first outlet conduit to the first outlet, while in the second position of the valve member, the fluid directing means block the first outlet conduit and the second inlet conduit, connect the first inlet conduit to the fluid inlet and connect the second outlet conduit to the second outlet; spring means acting on said other end of the valve member to bias the valve member towards its first position; means to control the rate of fluid flow through the passage means to cause the valve member to assume its first position under the influence of the spring means when the bleed valve is open; and a reversibly movable control member positioned in the second bore between, on the one hand, points at which the first inlet conduit and the first outlet conduit open into the second bore and, on the other hand, points at which the second inlet conduit and the second outlet conduit open into the second bore, the control member being associated with the arm of the bleed valve and movable under the influence of fluid entering the second bore from the first inlet conduit to open the bleed valve and movable under the influence of fluid entering the second bore from the second inlet conduit to close the bleed valve; closing of the bleed valve permitting fluid pressure on said other end of the valve member to decay through escape of fluid through said passage means whereby the valve member is moved to its second position by fluid pressure exerted on said one end from the fluid inlet.

9. A cycling valve, comprising a housing provided with first and second bores; a fluid-tight bulkhead dividing the second bore into first and second portions; a fluid inlet in the housing opening into one end of the first bore; first and second fluid outlets in the housing and opening into the first bore at spaced apart positions intermediate the ends thereof; a bleed passage extending between the other end of the first bore and the second portion of the second bore; a bleed valve associated with the bleed passage and having open and closed positions in which fluid flow through the bleed passage is respectively permitted and prevented; first and second inlet conduits and first, second and third outlet conduits extending between the first and second bores, the first inlet conduit opening into both portions of the second bore, the second inlet conduit, the first outlet conduit and the third outlet conduit opening into the first portion of the second bore and the second outlet conduit opening into the second portion of the second bore; a valve member slidably located in the first bore so that one end of the valve member is exposed to said inlet and the other end of the valve member is exposed to said bleed passage, the valve member being slidable between first and second positions; passage means in the valve member connecting said other end thereto to the first fluid outlet in both positions of the valve member; fluid directing means on the valve member which, in the first position of the valve member, block the first inlet conduit, the second outlet conduit and the third outlet conduit, connect the second inlet conduit to the fluid inlet and connect the first outlet conduit to the first outlet, while in the second position of the valve member the fluid directing means block the first outlet conduit and the second inlet conduit, connect the fluid inlet to the first inlet conduit, connect the second outlet conduit to the second outlet and connect the third outlet conduit to the first outlet; spring means acting on said other end of the valve member to bias the valve member towards its first position; means to control the rate of fluid flow through the passage means to cause the valve member to assume its first position under the influence of the spring means when the bleed valve is open; a piston slidably located in the first portion of the second bore between, on the one hand, the points where the first inlet conduit and the first outlet conduit open into the second bore, and on the other hand, the points where the second inlet conduit and the third outlet conduit open into the second bore; a piston rod extending from the piston through the bulkhead and being operatively associated with the bleed valve whereby movement of the piston under the influence of fluid entering the first portion of the second bore opens and closes the bleed valve, fluid entering said first portion from the first inlet conduit causing the piston to open the bleed valve and fluid entering said first portion from the second inlet conduit causing the piston to close the bleed valve, closing of the bleed valve permitting fluid pressure on said other end of the valve member to decay through escape of fluid through said passage means whereby the valve member is moved to its second position by fluid pressure exerted on said one end from the fluid inlet.

10. A cycling valve according to claim 9 including a restriction in the third outlet conduit to control the speed of movement of the piston.

11. A cycling valve according to claim 9 including a compression spring interposed between the piston and the bulkhead.

References Cited in the file of this patent
UNITED STATES PATENTS

| | | |
|---|---|---|
| 1,145,791 | Pigott | July 6, 1915 |
| 2,589,650 | Wolcott | Mar. 18, 1952 |
| 2,766,847 | Harter | Oct. 16, 1956 |